(12) United States Patent
Bruke

(10) Patent No.: US 6,187,180 B1
(45) Date of Patent: Feb. 13, 2001

(54) APPARATUS FOR SCREENING

(75) Inventor: Richard L. Bruke, Bunkeflostrand (SE)

(73) Assignee: Spirac Engineering AB, Malmo (SE)

( * ) Notice: Under 35 U.S.C. 154(b), the term of this patent shall be extended for 0 days.

(21) Appl. No.: 09/269,627

(22) PCT Filed: Oct. 7, 1997

(86) PCT No.: PCT/SE97/01682

§ 371 Date: Mar. 30, 1999

§ 102(e) Date: Mar. 30, 1999

(87) PCT Pub. No.: WO98/15336

PCT Pub. Date: Apr. 16, 1998

(30) Foreign Application Priority Data

Oct. 7, 1996 (SE) .................................................. 9603690

(51) Int. Cl.[7] .............................. B01D 29/88; B03B 9/14; B03B 9/18

(52) U.S. Cl. .......................... 210/116; 210/147; 210/408; 210/409; 210/414; 210/415; 100/117

(58) Field of Search ...................................... 210/109, 116, 210/408, 409, 412, 413, 414, 415, 407, 147; 100/117

(56) References Cited

U.S. PATENT DOCUMENTS

| 3,938,434 | * | 2/1976 | Cox. |
| 4,155,299 | * | 5/1979 | Tuttle. |
| 4,528,098 | * | 7/1985 | Treyssac et al. . |
| 4,915,830 | * | 4/1990 | Mackay et al. . |
| 5,034,128 | * | 7/1991 | Hillstrom et al. . |
| 5,122,263 | * | 6/1992 | Huber. |
| 5,205,930 | * | 4/1993 | Obrestad. |
| 5,372,713 | | 12/1994 | Huber ................................ 210/158 |

FOREIGN PATENT DOCUMENTS

| 3122131 | 12/1982 | (DE) . |
| 4143376 | 4/1993 | (DE) . |
| 0565898 | 10/1993 | (EP) . |
| 9519212 | 7/1995 | (WO) . |

OTHER PUBLICATIONS

English Abstract of EP 0565898.
English Abstract of DE 3122131.

* cited by examiner

Primary Examiner—David A Simmons
Assistant Examiner—Fred Prince
(74) Attorney, Agent, or Firm—Ladas and Parry (57) ABSTRACT

The apparatus for removing bodies (41) from a liquid in which the apparatus includes a first container (1) which is provided with an inlet (13) through which the liquid is supplied to the first container, and a second container (2) which, in the lower region (35) of the apparatus, surrounds the first container. Between the wall (17) of the first container and the wall (27) of the second container, there is formed a space (26). The wall of the first container is provided with passages (15) through which liquid passes from the first container to the space (26). The passages (15) are dimensioned so as to separate bodies (41) transported by the liquid towards the inside of the wall (17) of the first container. A helix (3) is disposed in a path (7) which is formed by the wall of the first container and is oriented at an angle (α) to the horizontal plane. On rotation of the helix, the separated bodies are displaced in the longitudinal direction of the path to a discharge aperture (14) in the upper region (11) of the first container (1).

10 Claims, 6 Drawing Sheets

APPARATUS FOR SCREENING

The present invention relates to an apparatus for screening substantially solid bodies and/or particles from a liquid, according to the preamble to the independent claim.

In, for example, treatment plants such as municipal waste water treatment plants, in process industries such as papermills and food industries, there is a need for separating solid and semi-solid bodies and impurities from water and other liquids. There is also a need to reduce the liquid content in the separated bodies in order to facilitate their continued handling. Depending upon what continued handling the bodies are to be subjected to, different requirements are placed on the dryness of the bodies before the continued handling is commenced. As a rule, total solids exceeding 20%, in certain practical applications total solids exceeding 30% are required, and in addition ti must be possible simply to control the dryness of the accumulated bodies depending upon the composition of bodies relevant at any given time.

According to prior art techniques, it is not possible to satisfy the above-outlined requirements in one single apparatus.

There is also a need, for example, in solid matter (grid screenings) separated in the mechanical cleaning stages in treatment plants for waste-water, for such material to be freed of adhering or accompanying biological material to the greatest possible extent prior to landfill deposition. In order to satisfy this need, new types of apparatuses have been developed in recent years to satisfy these needs.

PCT-application No. WO 95/19212 describes such an apparatus comprising a treatment container 12 and an inclining conveyor 42 with a casing which is provided with a screening aperture and which surrounds a conveyor screw. In its upper region, the conveyor is provided with a discharge aperture. This is preceded by a conveyor section where the cross-section of the casing is reduced as compared with the cross-section in that section where the screenings are fed into the conveyor.

Prior art equipment of the above-described type suffers from any shortcomings. In static screens and rotating drum screens, only screening of the liquid takes place, for which reason dewatering and possible washing must be carried out in separate machines. The drum screens use only a slight part of their screen surface for effective screening. The newly-developed combination machines for washing/screening/dewatering have a small screening surface, operate unreliably, for example suffer from problems in upward conveyance of screenings, in addition to which it is not possible to regulate the total solids of the material discharged at the machines. The machines are unwieldly, bulky and have high energy consumption. Moreover, the grid screenings which leave these machines have an undesirably high liquid content.

The demands placed on efficient screening combined with dewatering of entrapped screenings and regulation of the total solids in material fed from the apparatus cannot be satisfied in one and the same apparatus according to the prior art technique. In the characterizing clause of the appended independent claim, a technique is defined which satisfies these established wishes and requirements.

Expedient embodiments of the present invention also for satisfying the desired washing function are disclosed in the appended subclaims.

The present invention will be described in greater detail hereinbelow with reference to a number of drawing figures, in which.

The apparatus according to the invention comprises a first container 1 and a second container 2, hereinafter often referred to as inner container 1 and outer container 2, respectively. The inner container is surrounded at least partly by the outer container. In one embodiment, the outer container is disposed to surround the first container only in the lower region 35 of the apparatus. Between the wall 27 of the outer container and the wall 17 of the inner container, there is formed a first space 26. The inner space of the first container carries reference numeral 16. In the embodiment illustrated in the figures, a prime mover 30 is disposed at the upper region of the apparatus.

At least one inlet 13 for liquid containing those bodies and/or particles 41 which are to be removed from the liquid is coupled to the inner container 1 and an outlet 24 for liquid from which bodies and/or particles have been removed is connected to this first space 26. As a rule, the outlet is provided with a shut-off valve 25.

The lower region of the inner container is designed as a screen—in certain embodiments as a screen with a washing section. The intermediate portion of the inner container may be considered as transport/predewatering zone—in certain embodiments as rinsing zone.

The upper region of the inner container is designed as a device for accumulation, compression and discharge of upwardly-conveyed screenings. Discharge takes place when the desired degree of compression has been achieved for the screenings.

The figures show embodiments of the present invention with two inlets 13 connected to the first container. The lower inlet is intended for the expedient supply of washing or rinsing liquid and the upper for supply of material which is to be screened or washed. As a rule, on screening alone, only one inlet 13 is required which is then generally connected to the lower region of the first container. In embodiments where a washing function is called for the inlet 13 is, as a rule, connected to the first container in an area above a predetermined highest liquid level 6a. As a rule, a device 53a is provided for sensing the highest permitted level 6a for liquid, and device 53b is provided for sensing a predetermined lowest level 6b for the liquid.

The devices 53a, b are coupled so as, for example, via control and regulator means (not shown in the figures) to regulate the liquid flow through the inlet 13 and/or to switch the shut-off valve 25 in order to regulate the size of the liquid flow out of the apparatus. The expression "regulate the liquid flow" is also taken to signify entirely open or entirely close the liquid flow. In its most simple form, the device for monitoring that the highest permitted liquid level 6a is not exceeded is designed as a spillway overflow which, as a rule, is disposed on the second container 2.

A threaded blade 33 (FIG. 1a) making a helix 3 is disposed in a path 7 formed by the inner container 1. A prime mover 30 is disposed to rotate the helix about its geometric centre axis 32. The path 7 and the geometric centre axis 32 of the helix make an angle α with a horizontal plane 5. As a rule, the inner container is of substantially cylindrical design in its lower and upper sections. Its cross-section is adapted to the outer radius of the helix, in that those portions of the wall 17 of the inner container against which the helix abuts on its rotation form a curved surface with a radius of curvature which, in its circumferential direction, corresponds to or exceeds the outer radius of the helix.

In the foregoing paragraph, the term threaded blade is employed without any restrictive import and encompasses a helical body whose cross-section is, for example, rectangular, conical, trapezoidal, ziggurate-like, etc. The term threaded blade is also taken to signify a body which is composed of two or more mutually interconnected part helices.

The wall 17 of the inner container is provided with passages 15 for liquid. The dimensions of the passages are adapted to the size of the solid bodies and/or particles 41 which are to be separated from liquid supplied to the inner container. As a rule, the passages 15 which are disposed in the lower region of the inner container, i.e. in that portion of the container where the liquid passes through the passages, are larger than in the upper region of the container where the screenings are thickened and compressed, When the liquid passes through the passages, bodies and/or particles which can not be displaced through the passages are retained against the wall 17 of the inner container.

Also in its upper region 11, the wall 17 of the inner container 1 is generally provided with passages 15 for liquid. Embodiments of the apparatus occur in which the wall 17 of the inner container displays passages throughout the entire length of the container. Often, the passages are disposed around the entire cylindrical circumference of the inner container. Such disposition of the passages is selected as a rule for the lower region 10 of the inner container in order to create as large a screening surface as possible.

In the intermediate portion 12 of the first container 1, nozzles 52 (cf. FIG. 1*a*) are provided in certain embodiments for emitting liquid jets in a direction which entails that the jets pass through the region of the central cavity of the helix. As a rule, and as shown in FIG. 1*a,* the nozzles 52 are disposed in two mutually spaced apart rows. All nozzles are disposed above the highest permitted liquid level of the apparatus. By the pouring of liquid, screenings adhering to the rotating helix are released, in addition to which the released material is moved by the liquid jets towards the inner circumferencial surface of the first container, whereby the transport of screenings in the axial direction of the apparatus is promoted. The liquid jets also rinse the screenings at the same time as the screenings are tumbled during their displacement.

In embodiments of the present invention where the apparatus is provided with means (not shown in the figures) which switch the direction of rotation of the helix 3, control means are generally included which only permit the one row of nozzles to emit liquid jets, namely that row whose nozzles, in the pertinent direction of rotation, direct their liquid jets against the drive-side of the wall 17 of the first container. The term "drive-side" is taken to signify that region of the wall along which the major fraction of the transported material is lifted up on rotation of the helix.

In the embodiment illustrated in FIG. 1, there is disposed in the inner container a central, stationary mechanical shaft 19, hereinafter referred to as central shaft 19 which is fixed to the lower wall of the apparatus (bottom wall 29). The shaft has a spatially fixed position and passes through the central cavity of the helix 3. The dimensions of the shaft are less than the diameter of the inner cavity of the helix. The shaft is, in certain embodiments, designed as an irregular tube. There are also embodiments in which the shaft is provided with external ribs, or has a cross-section with at least one corner. The width of the threaded blade 33 in the radial direction and the radius of the shaft are selected so as, when the shaft inclines, to cause, on rotation of the helix, the threaded blade to come into abutment bey force of gravity against the wall 17 of the inner container and/or against material located between the threaded blade and the wall 17 of the inner container. In the region adjacent the second mechanical shaft 18, the helix is free-going, i.e. there is no abutment against the wall 17 of the container or against the central mechanical shaft 19.

The centre shaft forms a stationary friction surface which prevents or impedes rotation of the screenings. It also prevents screenings from being washed down through the central cavity of the helix in that is prevents the material (the screenings) from passing over the inner edge of the threaded blade. Hereby, the transport capacity of the apparatus is improved.

In certain embodiments, the central shaft 19 is used as conduit for washing or rinsing liquid. In these embodiments, the central shaft is designed as a hollow tube whose circumferencial surface is provided with apertures through which the liquid passes.

The length of the centre shaft is adapted such that the shaft meets the rotary drive shaft 18 at which the helical thread is fixed. The helical thread terminates a distance from the ejector aperture, whereby there is formed a helix-free space 23 between the drive shaft 18 and the upper end wall 18 of the apparatus. The drive shaft is, in the region of the discharge aperture 14 (which is disposed in the wall of the inner container), provided with means 51 which act on screenings accumulated in the ejector zone in the radial direction. The ejector aperture located in the sidewall of the cylindrical casing is generally provided with a mechanical closure device 50, for example a hatch 50. Details in respect of this design will be disclosed hereinbelow.

Figure 2:
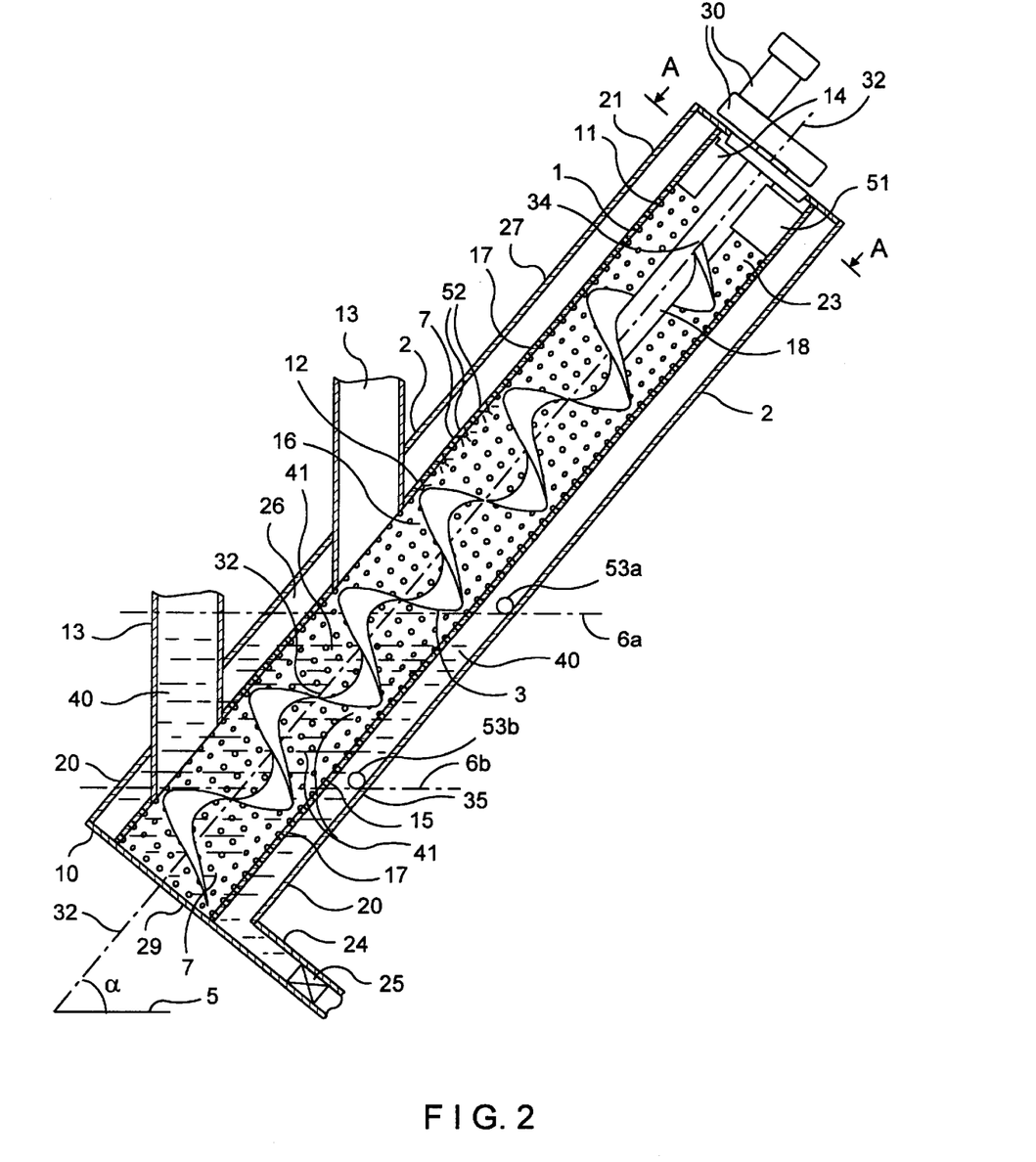
FIG. 2 shows a second embodiment of the present invention without a fixed mechanical shaft.

FIG. 2 shows one embodiment in which the apparatus has no mechanical shaft.

Figure 3A:
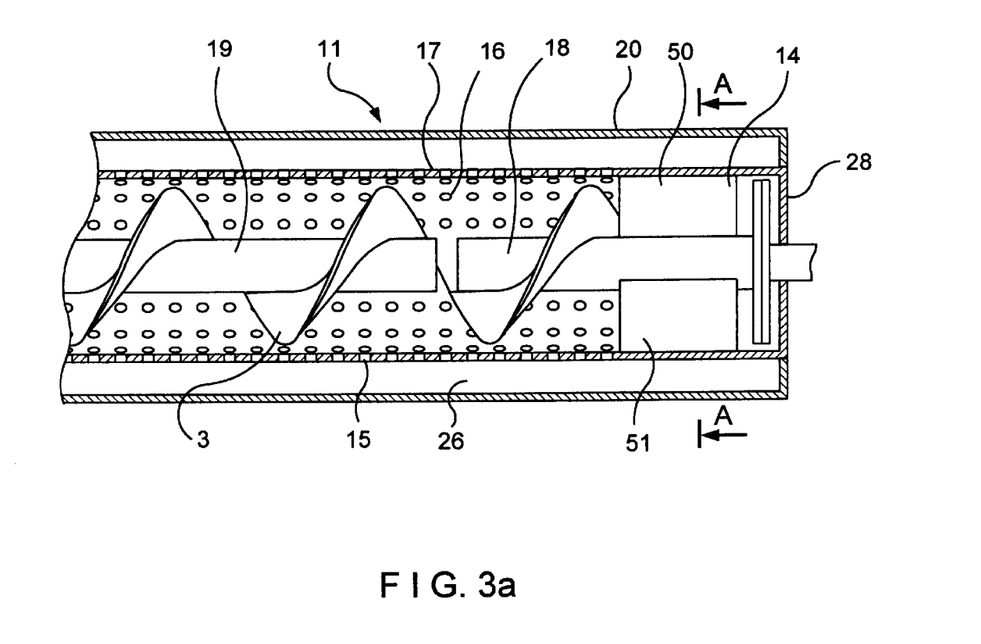
FIGS. 3a and 3b show magnified longitudinal sections through the apparatus in its upper end region in the embodiments according to FIGS. 1 and 2.
Figure 3B:
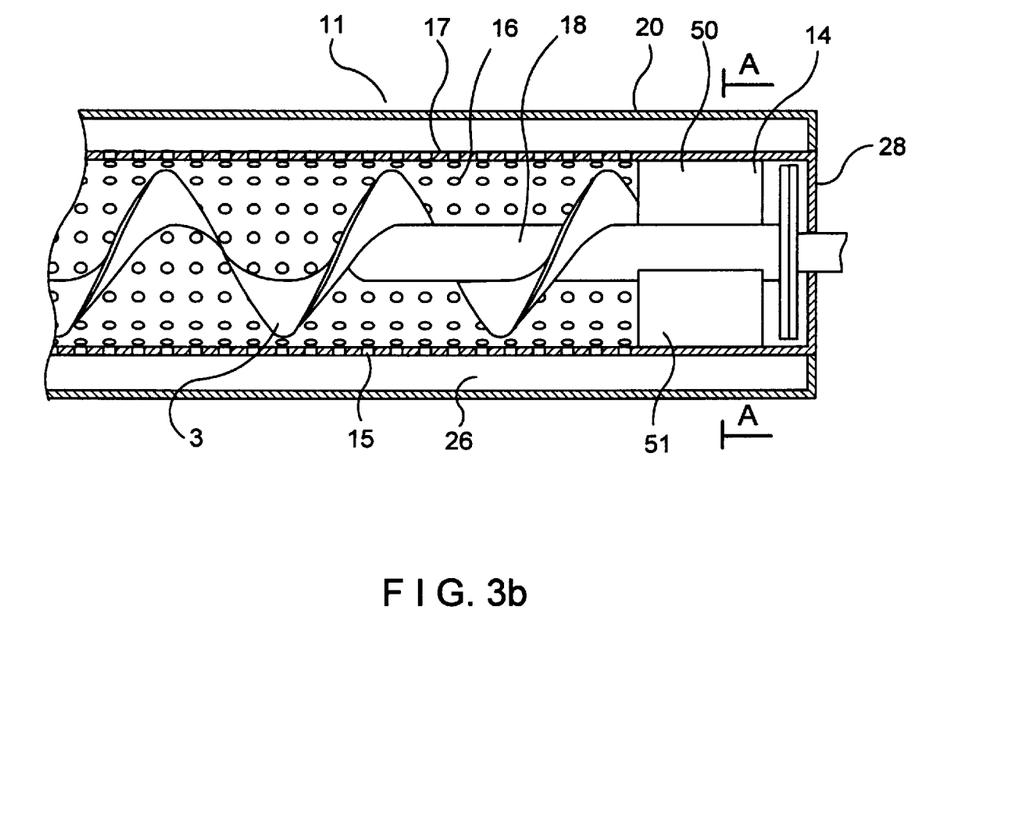

FIG. 3*a* shows the upper region of embodiments of the invention, where it will be apparent that the stationary, first mechanical shaft 19 meets a rotary second shaft 18 which, in its upper end, is connected to a prime mover 30 and in its lower end projects in at least one half of a helical turn into the helical thread 3 with which it is fixedly connected. It will be apparent from the drawing figure that the free end 34 of the helix is located a distance from the discharge aperture 14 and the discharge device 51 described below. FIG. 3*b* shows a similar embodiment in which shaft 18 is omitted.

The helix-free space 23 which is formed about the second shaft 18 from the free end of the helical thread and up to the upper end wall of the first container constitutes an accumulation compartment for upwardly transported screenings.

The circumferential surface of the inner container has, in the region proximal the upper end wall of the container, a discharge aperture 14 which, as a rule, is provided with the regulatable hatch 50 for closure and opening, respectively, of the discharge aperture. The rotary second shaft 18 is, in the region of the discharge aperture, provided with a discharge device 51 which is fixedly connected to the shaft and which influences accumulated screenings with a radially acting force.

The helical thread connected to the rotary second shaft 18 terminates a distance from the discharge device 51. The length in the axial direction of the helix-free region around the shaft 18 and up to the discharge device is preferably at least equal to half of the diameter of the helical thread and seldom exceeds the length of the entire diameter.

The circumferencial surface of the inner container is, in the region along the helix-free extend preferably irregular so as to prevent rotation of screenings accumulated in this region. The circumferencial surface of the inner container has, in the area at the ejector aperture 14, preferably cylindrical form with a substantially circular cross-section.

The discharge aperture 14 is, as a rule, provided with an ejector chute 80 (cf. FIG. 1a, b). This has a first wall 81 which is disposed on one side of the discharge aperture 14 and directed tangentially of the cross-section of the inner container. On the opposing side of the discharge aperture, the ejector chute is provided with a second wall 82 which is opposed to the first. Both walls are connected with transverse walls oriented such that the ejector chute will have a substantially rectangular cross-section. Generally, the distance between the first and second wall increases with increasing distance from the discharge aperture 14.

The discharge device 51 is in the form of a vane 51 which is permanently fixed to the drive shaft 18. The cross-section of the vane is preferably conical, with the top of the cone directed from the centre axis of the drive shaft. On rotation of the drive shaft, the top of the cone passes with slight clearance the inner surface of the inner container.

As a result of the cross-section of the discharge device 51, the device will, on its rotation past the area of the discharge aperture 14, act on material which abuts against the device with forces in a direction which substantially corresponds to the direction of the ejector chute. This facilitates displacement of the material out through the discharge aperture 14.

Figure 1:
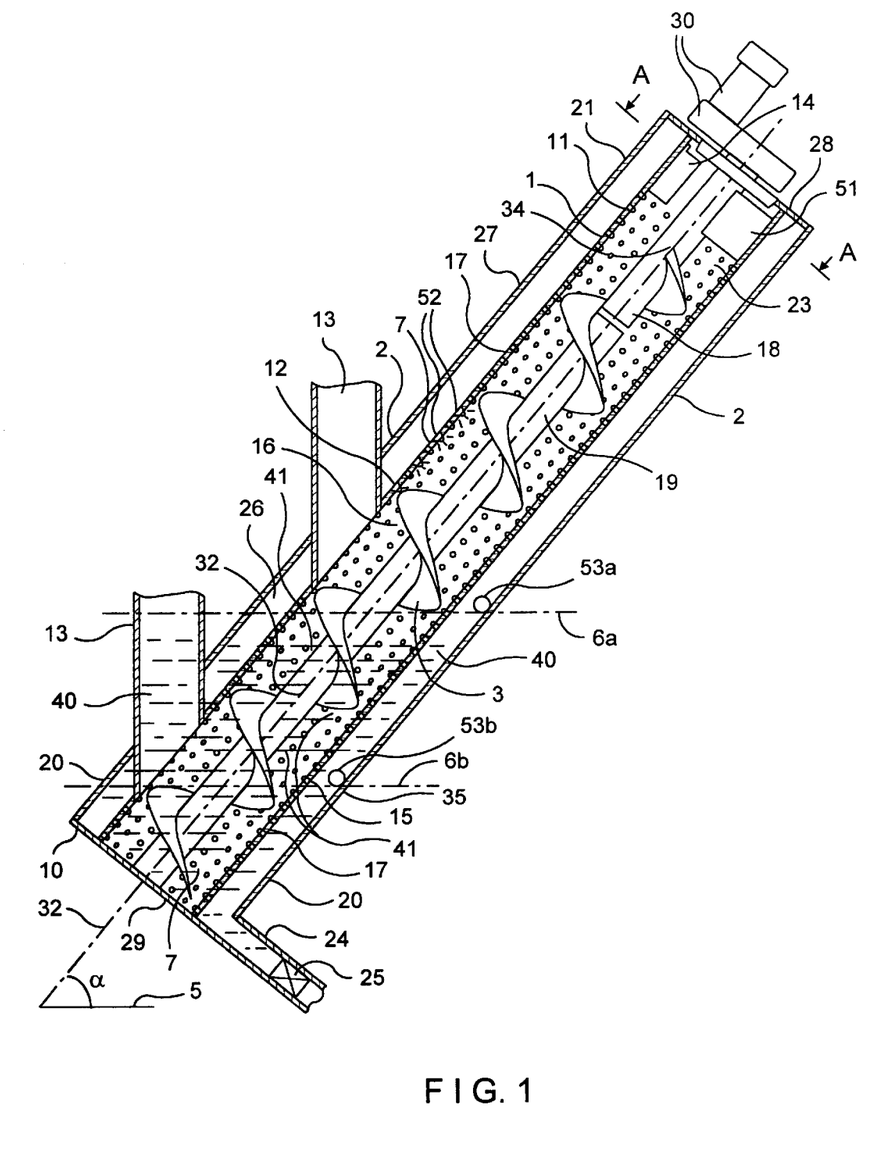
FIG. 1 is a longitudinal section through a first embodiment of the apparatus.
Figure 1A:
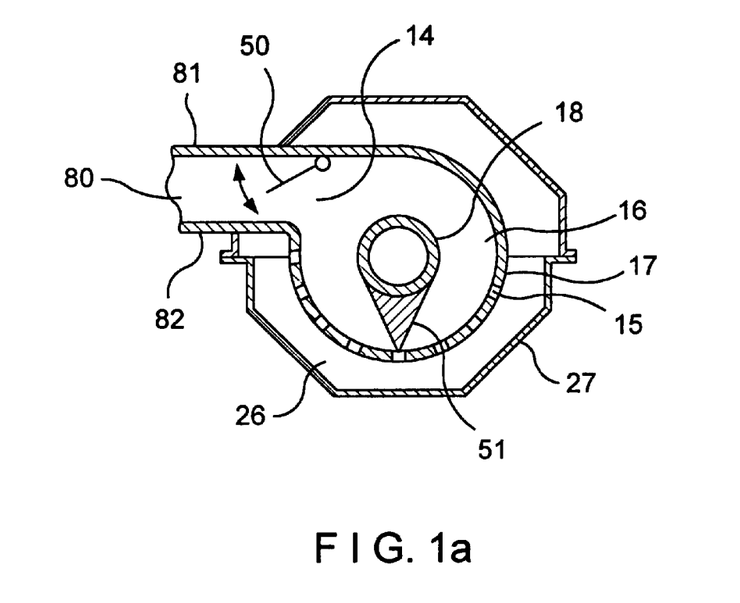
FIG. 1a is a section taken along the line A—A in FIG. 1.
Figure 1B:
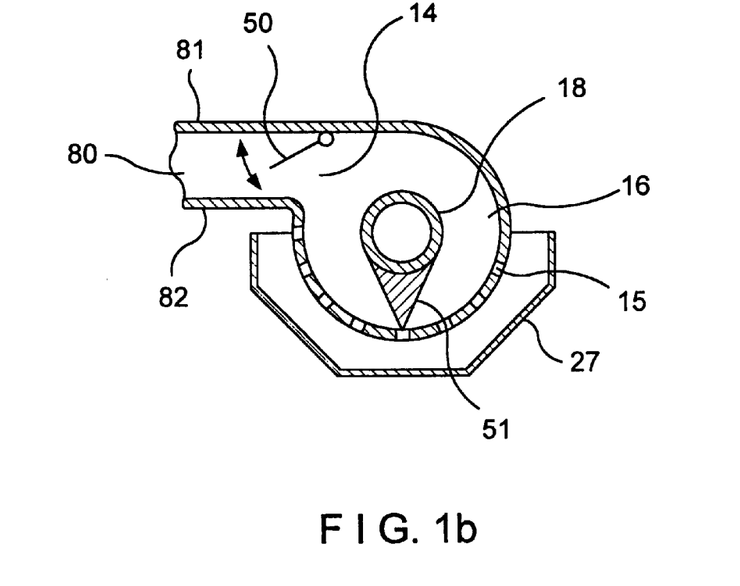
FIG. 1b shows an alternative embodiment of the apparatus in the region of the section A—A.

In its lower end, the second mechanical shaft 18 is fixed to the helix 3 and, in its upper end, connected to the prime mover 30 (cf. FIG. 1). The prime mover rotates the second mechanical shaft which, in its turn, rotates the helix 3 about the geometric centre axis 32 of the helix.

Figure 4:
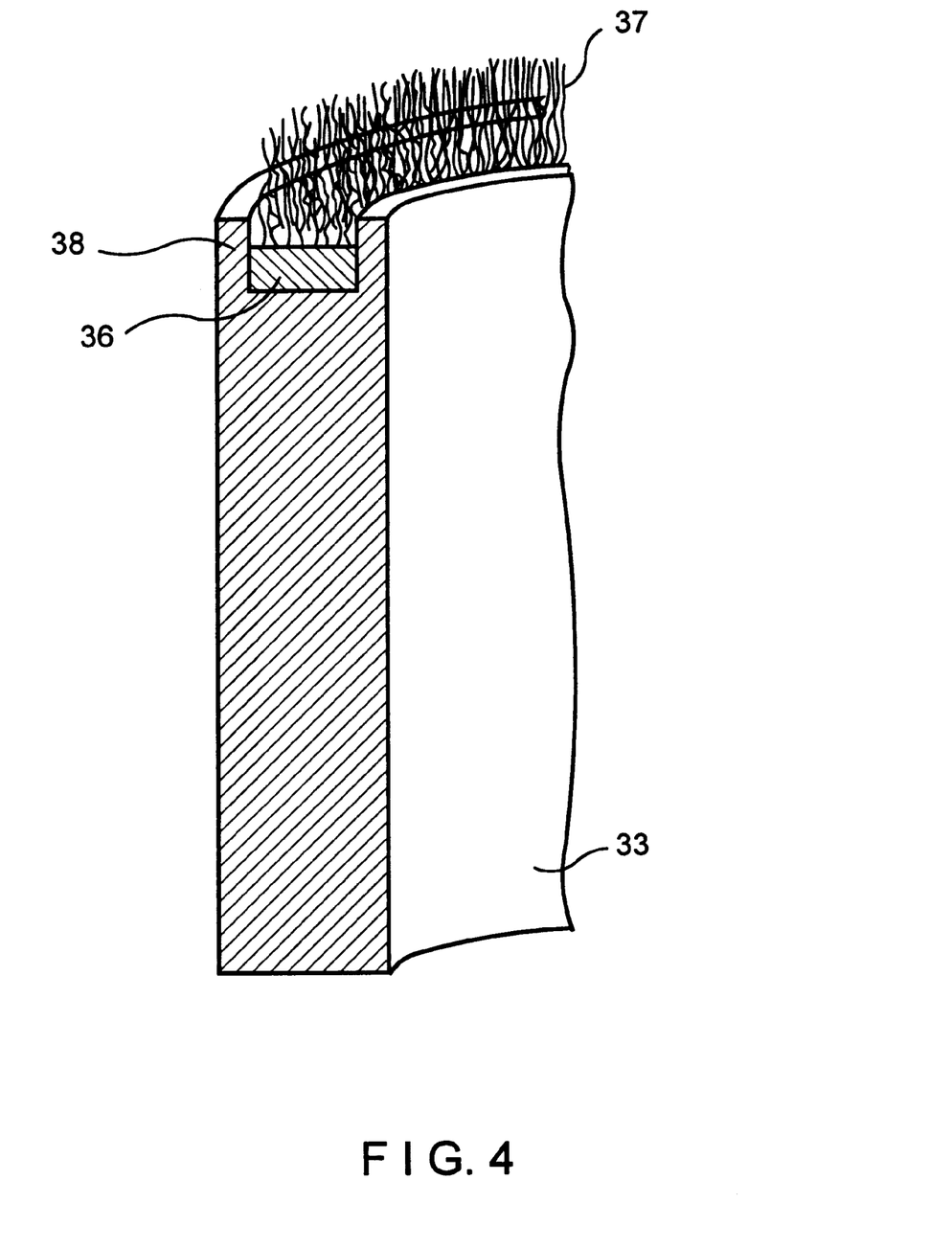
FIG. 4 is a sectioned portion of a thread blade provided with a brush.

FIG. 4 shows one embodiment of a threaded blade 33 provided with a doctor device 36 which forms a flexible periphery in the helix 3. In the illustrated embodiment, the doctor device is designed as a helical brush 36 which is secured to that edge of the helical blade which the helix 3 faces towards the wall 17 of the inner container. In the illustrated embodiment, the brush 36 is secured in a gutter-shaped bracket 38 disposed in the outer edge of the threaded blade. The bracket and the brush are dimensioned so as to permit the bristles 37 of the brush to project out past the outer edge of the threaded blade, whereby the free bristle ends of the brush form the portion of the helix located most proximal the container wall 17. On rotation of the helix, the bristles of the brush abut against the wall 17 of the inner container at least during a part of the rotation of the helix.

As illustrated in FIG. 4 and described in the foregoing paragraph, the threaded blade 33 of the helix is, in all embodiments, generally provided with brush-like means 36 disposed along the edge of the helix facing away from the centre. The brush-like means form doctor devices for material which adhere to the inside of the wall 17. It will be obvious to a person skilled in the art that such doctor or scraper devices may be of other design, for example may be designed as resilient plastic strips, scraper blades of rubber, etc.

Liquid container bodies and/or particles (hereinafter also referred to as solids) is fed to the inner container 1 of the apparatus through the inlet 13. The liquid passes from the inner container 1 out to the space 26 between the wall 17 of the inner container and the wall 27 of the outer container.

When the liquid flows through the passages 15, solid and/or semi-solid bodies are filtered out of the liquid in that they remain against the wall 17 of the inner container. On rotation of the helix, the accumulated solids are displaced along the path 7 of the apparatus up to the upper region of the inner container inn order there to be discharged out of the apparatus through the discharge aperture 14. The liquid which is located in the space 26 between the walls of the first container and the second container departs from the space through the outlet 24.

In those embodiments in which nozzles 52 spray liquid jets against the bodies and/or particles which are displaced in the path 7, impurities (for example biological impurities) adhering to the bodies and/or particles and soluble in the liquid are released as a result of being sprayed with liquid. The liquid spraying also entails that the bodies and/or particles are moved towards the wall 17 of the inner container, whereby the efficiency in conveyance by the helical thread 3 of the bodies and/or particles is improved, since their rotation with the helical thread is prevented.

On displacement of the material towards the discharge aperture 14, an accumulation of matter takes place when the hatch 50 is closed and thereby a compression of such matter under the formation of a plug of matter in the upper region of the inner container (its helix-free region), since the closed hatch 50 prevents the matter from passing out through the discharge aperture. On compression of this matter, the quantity of liquid absorbed in the matter is reduced. The liquid departs from the first container through the passages 15 which are provided in the wall of the first container in that portion of the container where the plug is formed. The degree of compression is determinative of the size of the reduction of the liquid content of the matter and, thereby, of the total solids degree in the matter which passes through the discharge aperture 14. The degree of compression is controlled by the force which is required to open the hatch. The apparatus is provided with control means for adjusting the requisite force.

The larger the quantity of screenings accumulated, the greater the force will be which the helix applies against the material pressed into the space, and the better will be the dewatering of the supplied material. The increased compression of the screenings implies that a steadily increasing torque is required for rotating the helix 3 permanently fixed to the drive shaft 18 and the discharge device 51. An automatically operating regulation of the opening or closing of the hatch, and thereby of he liquid content or compression of the screenings will be attained in that the hatch 50 of the discharge aperture 14 is pretensioned, for example mechanically or pneumatically.

In a first embodiment of the apparatus, the degree of compression is set for the material by adjustment (e.g. by alteration of the pretensioning of the spring) of the total force which the material must apply against the hatch for this to be opened or closed.

In a second embodiment, the degree of compression is adjusted in that a device (for example a hydraulic piston, a pneumatic ram, an electromagnetic operating device) opens or closes the hatch when the driving power for rotating the helix passes a preset value (as a rule the current force is measured).

In all embodiments, it is a simple matter also during ongoing operation of the apparatus to adapt the settings and thereby the degree of compression in accordance with the properties of the material which is to be compressed and the degree of total solids which is required. By adjusting the degree of compression, the desired total solids will be achieved in the material in the formed plug, and thereby in the material which is discharged out through the discharge aperture 14. Total solids exceeding 20% and as a rule 25% will be achieved for most forms of material. In normally occurring fibrous screenings, total solids contents exceeding 35% will be achieved.

The total force which is required for displacing the plug towards the discharge device determines the total solids of the material which is discharged out of the apparatus. If the total force is increased the degree of compression and thereby the total solids of the material discharged out of the apparatus is increased.

In the helix-free region between the end of the helical thread and up to the rotating discharge device 51, there is formed a substantially stationary plug of material whose rotation is preferably prevented as a result of a not round design of the surrounding circumferencial wall, for example a polygonal cross-section of the wall. The edge of the rotating discharge device which meets the advancing plug of material shaves off material from this so that an accumulated collection of finally-divided rotating screenings will be formed in the region of the discharge device. When the hatch of the discharge aperture is opened, screenings are rapidly displaced out of the region at the same time as the stationary plug remains intact. Comminution, or fine-dividing of the screenings is an advantage when this is often incinerated. The rapid discharge of screenings markedly reduced the amount of the power required to be supplied to the prime mover. In certain embodiments, the movement of the hatch is controlled based on the power output fed to the prime mover. This is put into effect most simply by measuring the current strength.

In a first embodiment of the apparatus, the degree of compression for the material is adjusted by setting, (for example by altering the pretensioning of a spring) of the total force which the material must apply against the hatch in order for this to open. In a second embodiment, the degree of compression is set in that a device (for example a hydraulic piston, a pneumatic ram, etc.) is provided for opening the hatch when the power output for rotating the helix exceeds a preset value (as a rule the current strength is measured). Controlling the position of the hatch, e.g. based on measured current strength is applicable because, on increased quantity of accumulated material in the helix-free section of the first container, higher torque is required and thereby higher torque to rotate the helix. When the material has passed out through the hatch and the pressure of the material against the hatch is reduced, the hatch is moved to its starting position by the spring force or by the above-mentioned pistons or rams. In all embodiments, it is a simple matter even during ongoing operation of the apparatus, to adapt these adjustments and thereby the degree of compression in accordance with the properties of the material which is to be compressed. By adjusting the degree of compression, the desired total solids will also be attained in the material in the formed plug, and thereby in the material which is discharged out through the discharge aperture 14.

As has already been described in the foregoing, on displacement of collected material towards the upper region of the path 7 and when the hatch 50 is closed, a plug of material is progressively built up in the helix-free space 23. The plug is generally of a length which exceeds a quarter of the outer helical radius and is often allowed to be of a length corresponding to approximately half of the outer helical radius. The major fraction of compression out of liquid takes place when the helix forces material against the plug. This takes place in a relatively restricted portion of the first container located on both sides of the upper end 34 of the helix 3. The portion is of a length of at least of approximately half of the outer diameter of the helix 3. The degree of compression, and thereby the total solids of the material which passes the discharge aperture 14 is determined by the size of the force which the hatch 50 exercises on the material before being opened.

Below will be given a description of the function of the apparatus in one embodiment in which this is employed for washing/rinsing of supplied screenings.

The shut-off valve 25 is closed and liquid is supplied to the apparatus to a predetermined maximum level. Screenings are led in through the in-feed aperture 13 which is preferably located just over the above-mentioned maximum level. The helix is reversed so that the screenings are alternatingly moved down and up in the liquid in the lower region of the apparatus and are there tumbled and kneaded. After a predetermined time, the rotation of the helix is discontinued, whereafter the valve 25 is opened and the liquid is emptied out. If necessary, this procedure may be repeated a number of times. Thereafter, the apparatus is emptied of liquid and material which has accumulated against the wall of the inner container is displaced by the helix towards the upper region of the apparatus. As a rule, rinsing takes place with rinsing liquid which is supplied by means of the nozzles 52. In the upper region of the apparatus, the material is compressed and discharged in a previously described manner.

The foregoing detailed description has referred to but a limited number of embodiments of the present invention, but a person skilled in the art will readily perceive that the present invention encompasses a large number of embodiments without departing from the scope of the appended claims.

What is claimed is:

1. An apparatus for removing solid and/or semi-solid bodies (41) from a liquid, where the apparatus includes a helix (3) formed by a threaded blade (33) and rotary about its geometric axis (32) and disposed in a path (7) which makes an angle ($\alpha$) with a horizontal plane, and where the apparatus includes drive means (30) for rotating the helix about its axis, characterized in that the apparatus includes a first container (1) comprising said path (7) and a second container (2) which, in the lower region (35) of the apparatus surrounds the first container (1) under the formation of a cavity substantially discrete in relation to the surroundings, that the cavity includes a first space (26) disposed between the wall (17) of the first container and the wall (27) of the second container; that the first container (1) is provided with an inlet (13) for the supply of liquid containing the solid and/or semi-solid bodies (41); that the wall (17) of the first container (1) is provided with passages (15) through which liquid passes from the first container (1) to the space (26) between the first container (1) and the second container (2); that said passages (15) are dimensioned in order, on flow of the liquid through them, to separate solid and/or semi-solid bodies (41) transported by the liquid towards the inside of the wall (17) of the first container; that the helix (3) is disposed, on its rotation, to displace the separated solid and semi-solid bodies in the longitudinal direction of the path; that the space (26) between the walls (17, 27) of the first and second containers is connected to an outlet (24) for liquid; that a discharge aperture (14) for bodies separated from the liquid is disposed in the upper region (11) of the first container (1); that a mechanical abutment (50) is associated with the discharge aperture (14) for controlled opening and closing of the discharge aperture; that the conveyor helix (3)

terminates a distance from the discharge aperture (14) for forming a helix-free zone (16) between the end (34) of the conveyor helix (3) and the upper end wall of the inner container; and that the helix-free zone includes a portion located between the end of the conveyor helix and the discharge aperture (14), in which portion the first container is provided with said passages (15) for the passage of liquid.

2. The apparatus as claimed in claim 1, characterized in that the helix (3) surrounds a substantially stationary mechanical shaft (19).

3. The apparatus as claimed in claim 1, characterized in that the helix is provided with scraper means (36) for, on its rotation, releasing material accumulated against the wall (17) of the first container.

4. The apparatus as claimed in claim 1, characterized in that the mechanical abutment (50) includes at least one hatch (50) which is disposed in the discharge aperture (14); that a device is provided for sensing the force which is exercised interiorly against the hatch by material accumulated in the helix-free zone or measurement of the current strength or power supplied to the prime mover (30); and that drive means are provided for displacing the hatch from or to the closed position based on the size of the force, current strength or power measured.

5. The apparatus as claimed in claim 1, characterized in that the distance between the upper end (24) of the helix (3) and the discharge aperture (14) amount at least to half of the outer diameter of the helix.

6. The apparatus as claimed in claim 1, characterized in that in the upper region (11) of the first container, there is provided a mechanical drive shaft (18) connected to the prime mover (30) for rotation of the helix (3); and that the mechanical shaft (18) extends at least one half of a helical turn into the upper end (34) of the helix (3).

7. The apparatus as claimed in claim 5, characterized in that a vane (51) is secured to the mechanical drive shaft (18) in the region of the discharge aperture (14); and that the vane forms a device projecting substantially radially from the mechanical drive shaft.

8. The apparatus as claimed in claim 1, characterized in that the first container (1), in an area above the highest calculated liquid level (6), is provided with nozzles (52) for emitting liquid jets towards the inside of the wall (17) of the first container.

9. The apparatus as claimed in claim 1, characterized in that the prime mover (30) is disposed, with controlled intervals, to rotate the helix (3) in a direction opposite to the direction in which the accumulated bodies are displaced towards the discharge apertures (14).

10. The apparatus as claimed in claim 1, characterized in that a level sensor (53) is provided for opening and closing a shut-off valve (25) at predetermined liquid levels.

* * * * *